United States Patent
Nojima

(10) Patent No.: US 11,880,122 B2
(45) Date of Patent: Jan. 23, 2024

(54) OPTICAL SYSTEM AND IMAGE PROJECTION APPARATUS

(71) Applicant: Kei Nojima, Tokyo (JP)

(72) Inventor: Kei Nojima, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 1 day.

(21) Appl. No.: 17/641,437

(22) PCT Filed: Nov. 4, 2020

(86) PCT No.: PCT/IB2020/060333
§ 371 (c)(1),
(2) Date: Mar. 9, 2022

(87) PCT Pub. No.: WO2021/099869
PCT Pub. Date: May 27, 2021

(65) Prior Publication Data
US 2022/0382134 A1    Dec. 1, 2022

(30) Foreign Application Priority Data

Nov. 19, 2019 (JP) ................................ 2019-208382

(51) Int. Cl.
*G03B 21/00* (2006.01)
*G02B 5/04* (2006.01)
*G03B 21/20* (2006.01)

(52) U.S. Cl.
CPC .............. *G03B 21/008* (2013.01); *G02B 5/04* (2013.01); *G03B 21/2066* (2013.01)

(58) Field of Classification Search
CPC .............. G03B 21/008; G03B 21/2066; G03B 21/2013; G02B 5/04; G02B 2027/0118;
(Continued)

(56) References Cited

U.S. PATENT DOCUMENTS 6,352,346 B1   3/2002 Kasai
9,983,402 B1 * 5/2018 Jackson ............. G02B 27/1066
(Continued)

FOREIGN PATENT DOCUMENTS

JP   2003-295110 A   10/2003
JP   2007-025287       2/2007
(Continued)

OTHER PUBLICATIONS

International Search Report dated Feb. 3, 2021 in PCT/IB2020/060333 filed on Nov. 4, 2020, 10 pages.
(Continued)

*Primary Examiner* — Magda Cruz
(74) *Attorney, Agent, or Firm* — XSENSUS LLP

(57) ABSTRACT

An optical system includes a light source configured to emit irradiation light, an optical modulation element having a plurality of reflection planes by which an incident light is reflected in a different direction, and an optical element having an interface through which the irradiation light emitted from the light source is emitted to the optical modulation element as the incident light and a first exit light reflected by the optical modulation element in a first direction is guided to a projection surface. Each one of the plurality of reflection planes is inclined with reference to a surface of the optical modulation element to reflect the incident light as the first exit light, and the surface of the optical modulation element is inclined with reference to the interface.

7 Claims, 6 Drawing Sheets

(58) Field of Classification Search
CPC .............. G02B 27/0101; H04N 9/3111; H04N 9/3164; H04N 9/317
See application file for complete search history.

(56) References Cited

U.S. PATENT DOCUMENTS

| | | | |
|---|---|---|---|
| 2003/0151834 A1 | 8/2003 | Penn | |
| 2003/0189692 A1 | 10/2003 | Kawano et al. | |
| 2003/0202259 A1* | 10/2003 | Nishimae | H04N 9/3152 348/E5.142 |
| 2004/0125600 A1* | 7/2004 | Fushimi | G03B 21/005 362/268 |
| 2005/0185249 A1* | 8/2005 | Uchiyama | G02B 13/0095 359/291 |
| 2005/0259229 A1* | 11/2005 | Lee | G02B 27/145 348/E9.027 |
| 2014/0118703 A1 | 5/2014 | Chang et al. | |
| 2015/0077725 A1* | 3/2015 | Shibayama | H04N 5/7458 362/282 |
| 2017/0208302 A1* | 7/2017 | Katsumata | G03B 21/008 |
| 2018/0003964 A1* | 1/2018 | Tatsuno | G02B 27/0172 |
| 2018/0003970 A1* | 1/2018 | Otani | G02B 27/0101 |
| 2020/0073218 A1* | 3/2020 | Yamamoto | G03B 21/204 |

FOREIGN PATENT DOCUMENTS

| | | |
|---|---|---|
| JP | 2016-019073 | 2/2016 |
| JP | 2016-062199 | 4/2016 |
| JP | 2017-090753 | 5/2017 |
| JP | 2017-129847 A | 7/2017 |
| JP | 2018-004817 A | 1/2018 |
| JP | 2018-004889 A | 1/2018 |
| JP | 2018-156065 A | 10/2018 |

OTHER PUBLICATIONS

Office Action dated May 24, 2023 in Japanese Patent Application No. 2019-208382, 5 pages.

Japanese Office Action dated Aug. 22, 2023, in corresponding Japanese Application No. 2019-208382, 9pp.

* cited by examiner

OPTICAL SYSTEM AND IMAGE PROJECTION APPARATUS

CROSS-REFERENCE TO RELATED APPLICATIONS

This application is based on PCT filing PCT/IB2020/060333, filed Nov. 4, 2020, which claims the priority to Japanese Patent Application No. 2019-208382, filed on Nov. 19, 2019, the entire contents of each are incorporated herein by reference in its entirety.

TECHNICAL FIELD

Embodiments of the present disclosure relate to an optical system and an image projection apparatus.

BACKGROUND ART

A grating structure that does not serve as a diffraction grating is provided at both edges of a mirror (Mass Block: Reflective mirror surface) that deflects the light (see, for example, PTL 1). An image display apparatus is known in the art that is provided with an approximately D-shaped aperture that cuts out the light in an angle domain where the incident light overlaps with the reflection light in an on-direction on a digital micromirror device (DMD) that serves as a reflective modulation element. If the interference region is removed, such an aperture is shaped like "D."

A projection display device in which a chrominance modulation light valve, a relay lens, and a DMD are arranged in accordance with the Scheimpflug principle is known in the art (see, for example, PTL 2).

CITATION LIST

Patent Literature

[PTL 1]
Japanese Patent Application Publication No. 2003-315733
[PTL 2]
Japanese Patent Application Publication No. 2005-242163

SUMMARY OF INVENTION

Technical Problem

According to one aspect of the present disclosure, an optical system and an image projection apparatus in which the effect of unnecessary light can be reduced are provided.

Solution to Problem

An optical system includes a light source configured to emit irradiation light, an optical modulation element having a plurality of reflection planes by which an incident light is reflected in a different direction, and an optical element having an interface through which the irradiation light emitted from the light source is emitted to the optical modulation element as the incident light and a first exit light reflected by the optical modulation element in a first direction is guided to a projection surface. In the optical system, each one of the plurality of reflection planes is inclined with reference to a surface of the optical modulation element to reflect the incident light as the first exit light, and the surface of the optical modulation element is inclined with reference to the interface. In the optical system, a direction in which each one of the plurality of reflection planes is inclined with reference to the surface of the optical modulation element is equivalent to a direction in which the surface of the optical modulation element is inclined with reference to the interface.

Advantageous Effects of Invention

According to one aspect of the present disclosure, an optical system and an image projection apparatus in which the effect of unnecessary light can be reduced are provided.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
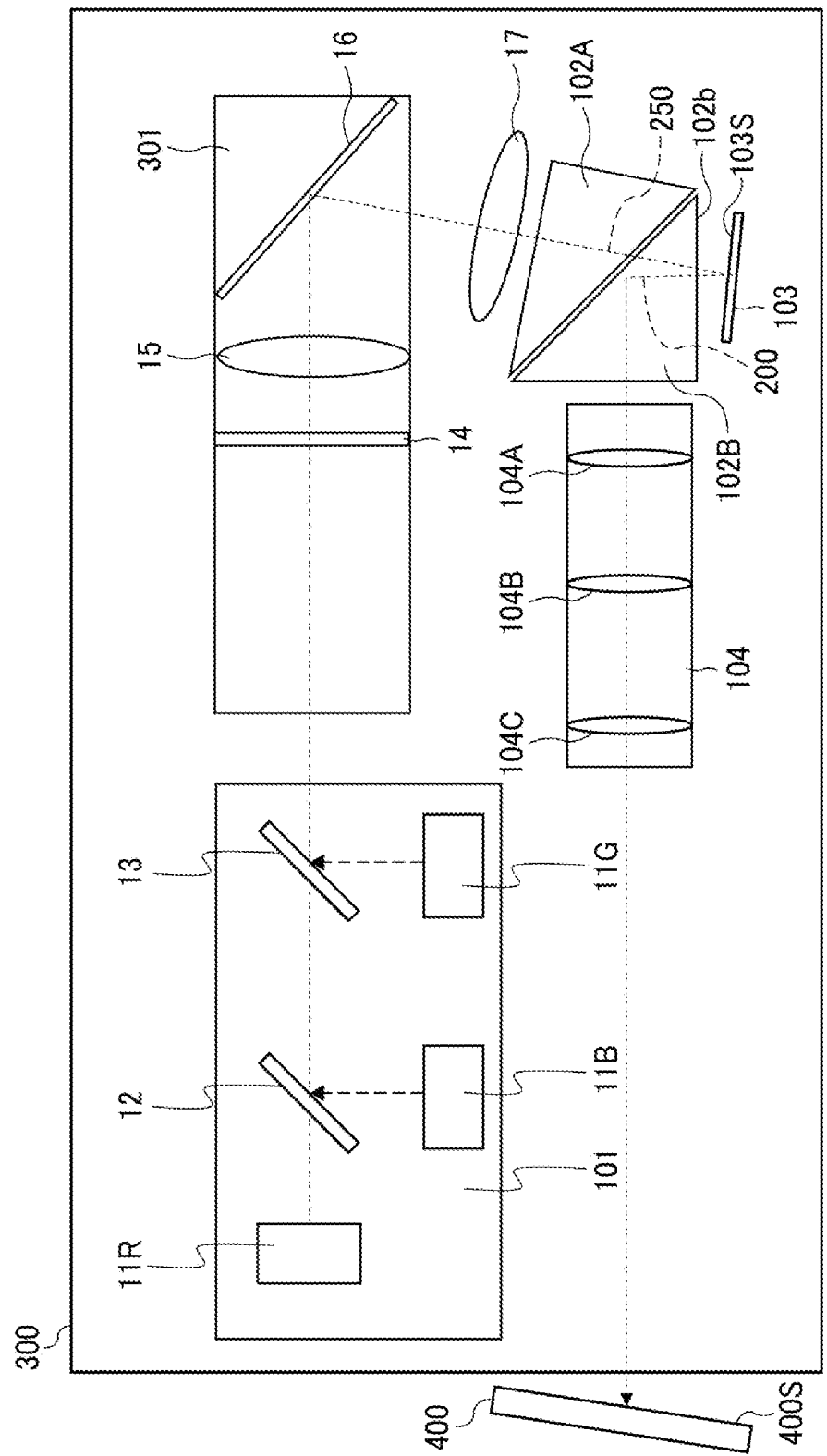
FIG. 1 is a sectional view of an image projection apparatus according to an embodiment of the present disclosure.

FIG. 1 is a sectional view of an image projection apparatus 300 according to embodiments of the present disclosure.

The image projection apparatus 300 is a front-projecting projector, and projects an image onto a screen 400. It is assumed that an image projection apparatus according to the present disclosure is provided for a vehicle. However, no limitation is indicated thereby, and an image projection apparatus according to the present disclosure can be used for various kinds of purposes or devices. For example, an image projection apparatus according to the present disclosure may be mounted on motorbikes or aircraft.

As illustrated in FIG. 1, the image projection apparatus 300 that serves as an optical system includes a light source 101, an illumination optical system 301, a field lens 17, a pair of optical elements 102A and 102B, an optical modulation element 103, and a projection optical system 104, and projects an image onto the screen 400 that serves as a projection surface.

The light source 101 includes three colored light sources 11R, 11B, and 11G that correspond to three colors of red (R), blue (B), and green (G) in a one-to-one relationship, and a pair of dichroic mirrors 12 and 13 where the wavelengths of the light to be reflected and the wavelengths of the light to be transmitted are determined in advance.

The illumination optical system 301 includes a fly-eye lens 14, a field lens 15, and a mirror 16 that are arranged in the order listed from the upstream side of the optical path so as to be separate from each other, and the irradiation light 250 that is emitted from the light source 101 guides the illumination light to the optical elements 102A and 102B through the field lens 17.

Preferably, each one of the pair of optical elements 102A and 102B is configured by a prism that has at least a pair of planes. In the present embodiment, each one of the pair of optical elements 102A and 102B is configured by a total-reflection triangular prism unit (so-called total internal reflection (TIR) prism unit). The optical element 102B has an interface 102b through which the irradiation light 250 is emitted to the optical modulation element 103 as incident light 250.

The optical modulation element 103 modulates the incident light 250 based on the image data. The optical modulation element 103 is configured by a digital micromirror device (DMD) that has an approximately rectangular-shaped mirror surface consisting of a plurality of micromirrors, and drives the above multiple micromirrors on a time-division basis based on the input image data. As a result, the light is processed and reflected so as to achieve an image based on the image data.

The projection optical system 104 includes a first lens 104A, a second lens 104B, and a third lens 104C that are arranged in the order listed from the upstream side of the optical path so as to be separate from each other.

In the above configuration, the irradiation light 250 that is guided by the illumination optical system 301 passes through the pair of optical elements 102A and 102B, and is emitted to the optical modulation element 103 as the incident light 250 through the interface 102b of the optical element 102B.

The optical modulation element 103 drives the multiple micromirrors on a time-division basis to switch between a state in which the incident light 250 is to be reflected as a first exit light 200 in a first direction and a state in which the incident light 250 is to be reflected as a second exit light in a second direction that is different from the first direction.

The optical element 102B reflects the first exit light 200 that is reflected by the optical modulation element 103 in the first direction and then has passed through the interface 102b, and transmits the second exit light that is reflected by the optical modulation element 103 in the second direction.

The first exit light 200 that is reflected by the optical element 102B is guided to the projection optical system 104 as an on-light beam that forms an image based on the image data, and the second exit light that is reflected by the optical modulation element 103 in the second direction is dealt with as an off-light beam that does not form any image. As the second exit light is incident on, for example, a structural grain and a light-absorbing band, its further reflection can be prevented.

The projection optical system 104 projects the first exit light 200 onto the screen 400 to form an image based on the received image data. For example, the screen 400 is configured by a microlens array (MLA).

In the present embodiment, a surface 400S of the screen 400, the principal plane of the projection optical system 104, a surface 103S of the optical modulation element 103 are arranged so as to satisfy the Scheimpflug principle. Due to such a configuration, the chances of blurriness can be reduced when an image that is formed by the first exit light 200 is projected onto the surface 400S of the screen 400.

Figure 2:
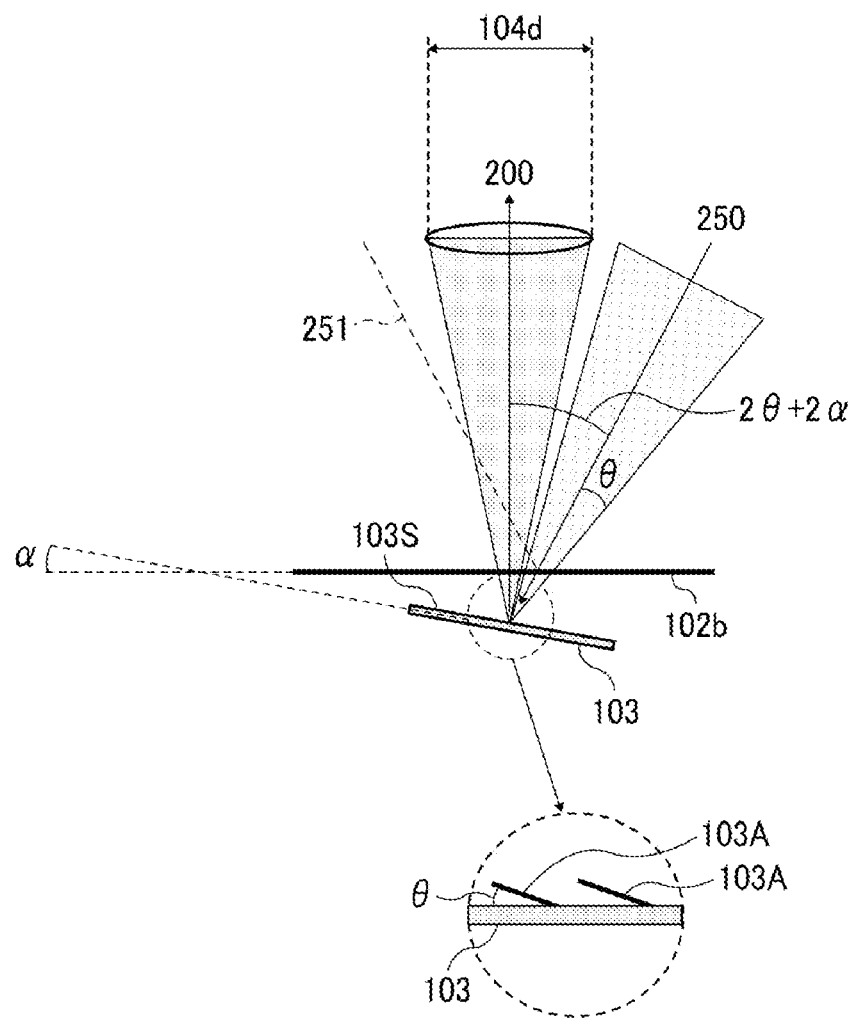
FIG. 2 is a diagram illustrating a detailed configuration or structure of an optical modulation element in the image projection apparatus as illustrated in FIG. 1.

FIG. 2 is a diagram illustrating a detailed configuration or structure of the optical modulation element 103 in the image projection apparatus 300 as illustrated in FIG. 1, according to the present embodiment.

The optical modulation element 103 has a plurality of reflection planes 103A, which are a plurality of digital micromirror devices (DMDs) in the present embodiment, and each one of the multiple reflection planes 103A is inclined by an angle $\theta$ in a clockwise direction with respect to the surface 103S of the optical modulation element 103. Due to such a configuration, the incident light 250 is reflected, and the first exit light 200 is emitted. The range in which the projection optical system 104 takes in the first exit light 200 is indicated by a reference sign 104d.

When each one of the multiple reflection planes 103A is driven to be parallel to the surface 103S of the optical modulation element 103, the incident light 250 is reflected, and the second exit light is emitted.

Moreover, the surface 103S of the optical modulation element 103 is inclined by an angle $\alpha$ in a clockwise direction with respect to the interface 102b of the optical element 102B so as to satisfy the Scheimpflug principle.

Due to the above configurations, each one of the multiple reflection planes 103A is inclined by an angle $\theta+\alpha$ in a clockwise direction with respect to the interface 102b of the optical element 102B. Accordingly, the angle that the incident light 250 forms with the first exit light 200 can be calculated by $2(\theta+\alpha)$.

In the present embodiment, most of the irradiation light 250 passes through the interface 102b of the optical element 102B, and is emitted to the optical modulation element 103 as the incident light 250. However, some of the irradiation light 250 is reflected by the interface 102b of the optical element 102B as reflection light 251.

In the present embodiment, as the angle that the incident light 250 forms with the first exit light 200 is $2(\theta+\alpha)$, the angle that the reflection light 251 forms with the first exit light 200 can also be calculated by $2(\theta+\alpha)$. In other words, the angle that the reflection light 251 forms with the first exit light 200 in the present embodiment is wide compared with when the surface 103S of the optical modulation element 103 is parallel to the interface 102b of the optical element 102B and $\alpha=0$.

As the surface 103S of the optical modulation element 103 is inclined with reference to the interface 102b of the optical element 102B so as to satisfy the Scheimpflug principle, the chance that the reflection light 251 is incident on the projection optical system 104 can be reduced. Due to such a configuration, the chance that the reflection light 251 is erroneously projected onto the screen 400 as stray light or unnecessary light can be reduced.

In other words, according to the present embodiment, the following two sorts of reductions can be achieved. The chances of blurriness can be reduced when an image that is formed by the first exit light 200 is projected onto the surface 400S of the screen 400, and the chance that the reflection light 251 is erroneously guided to the screen 400 as stray light or unnecessary light can be reduced. Whereas a light shield or a light-shielding mechanism is required in the related art, stray light or unnecessary light can be reduced with no light shield in the present embodiment. Accordingly, in the present embodiment, both high light output and high resolution can be achieved.

Figure 3:
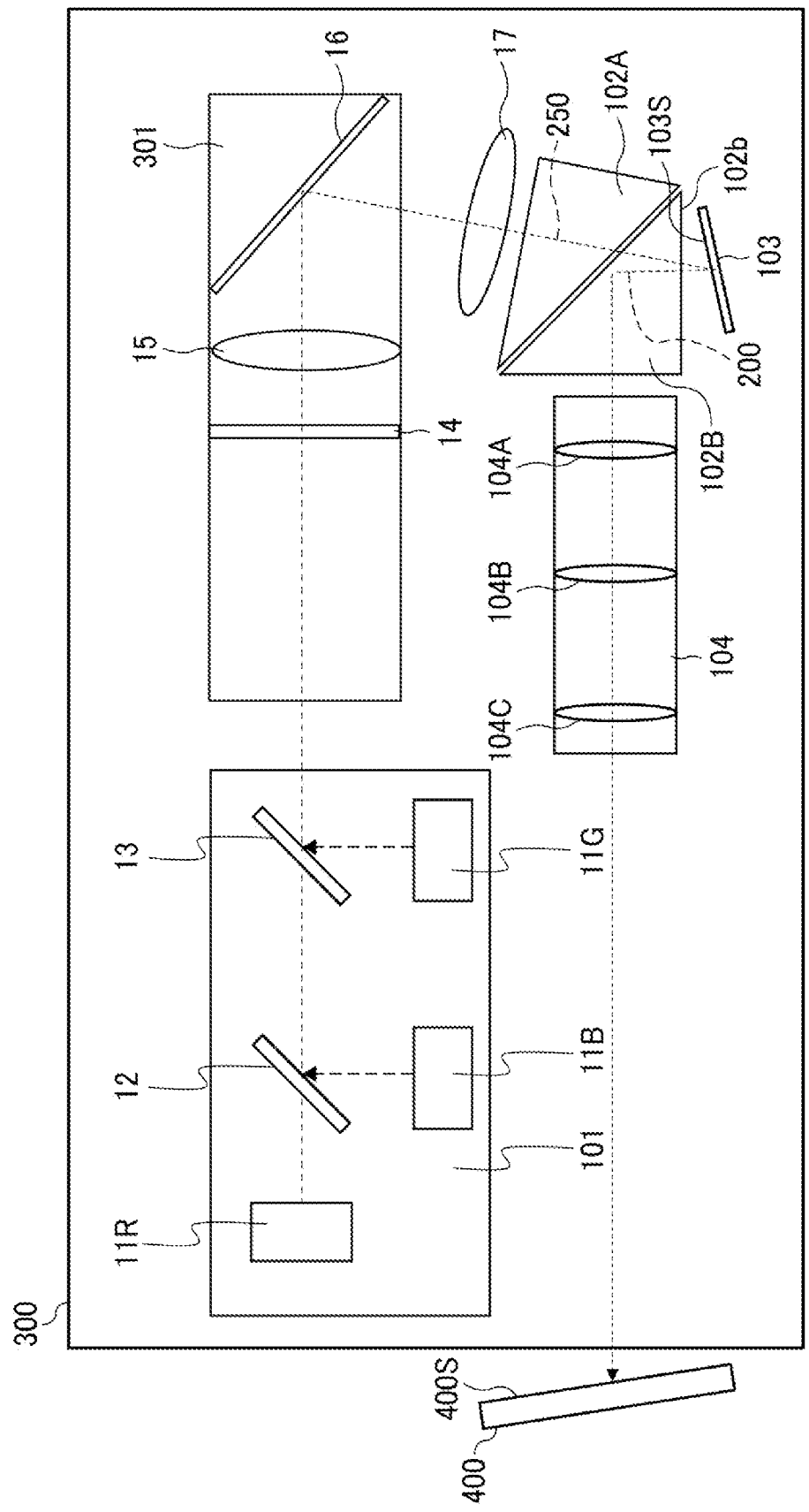
FIG. 3 is a sectional view of the image projection apparatus as illustrated in FIG. 1, according to a control sample of the above embodiment of the present disclosure.

FIG. 3 is a sectional view of the image projection apparatus 300 as illustrated in FIG. 1, according to a control sample of the above embodiment of the present disclosure.

The surface 400S of the screen 400 as illustrated in FIG. 3 is inclined in the opposite direction with reference to the surface 400S of the screen 400 as illustrated in FIG. 1, and the surface 103S of the optical modulation element 103 as illustrated in FIG. 3 is also inclined in the opposite direction with reference to the surface 103S of the optical modulation element 103 as illustrated in FIG. 1. As a result, the surface 400S of the screen 400, the principal plane of the projection optical system 104, the surface 103S of the optical modulation element 103 are arranged so as to satisfy the Scheimpflug principle. The configuration or structure of the present control sample of the above embodiment of the present disclosure other than the screen 400 and the optical modulation element 103 is equivalent to that of the above embodiment of the present disclosure as illustrated in FIG. 1.

Figure 4:
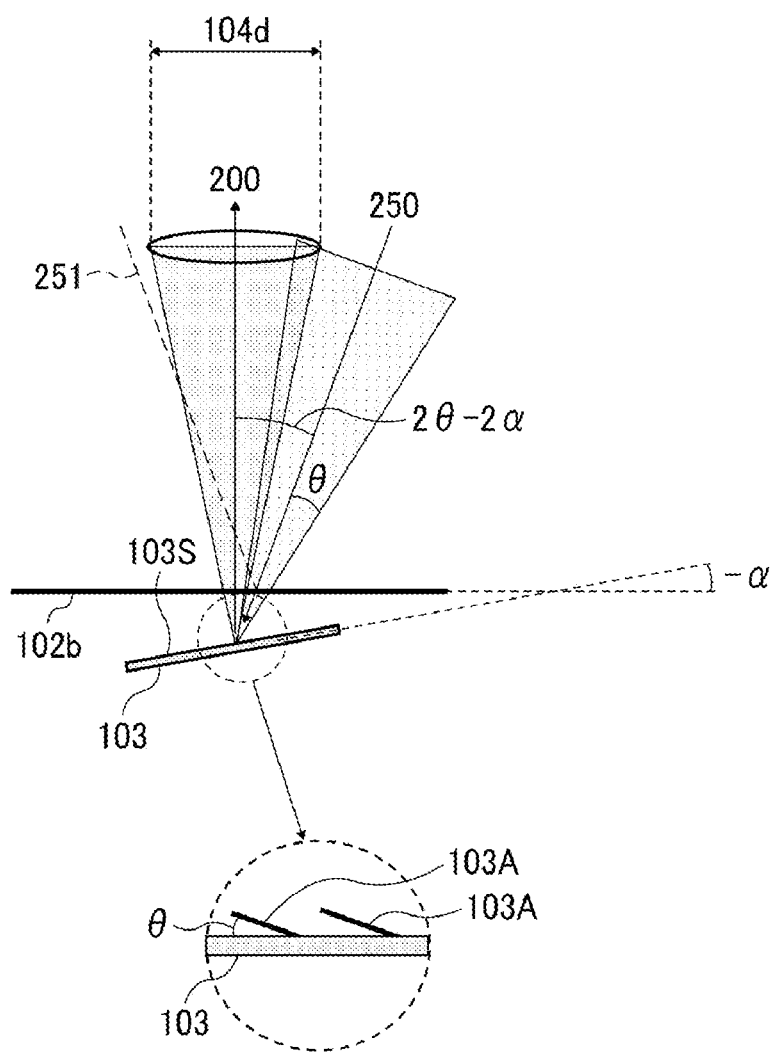
FIG. 4 is a diagram illustrating a detailed configuration or structure of an optical modulation element in the image projection apparatus as illustrated in FIG. 3, according to a control sample of the above embodiment of the present disclosure.

FIG. 4 is a diagram illustrating a detailed configuration or structure of the optical modulation element 103 in the image projection apparatus 300 as illustrated in FIG. 3, according to the control sample of the above embodiment of the present disclosure.

In a similar manner to FIG. 2, each one of the multiple reflection planes 103A is inclined by an angle $\theta$ in a clockwise direction with respect to the surface 103S of the optical modulation element 103. As a result, the incident light 250 is reflected, and the first exit light 200 is emitted.

By contrast, in the present control sample of the above embodiment of the present disclosure, unlike the configuration as illustrated in FIG. 2, the surface 103S of the optical modulation element 103 is inclined by an angle $\alpha$ in a counterclockwise direction with respect to the interface 102b of the optical element 102B.

Due to the configuration of the present control sample as described above, each one of the multiple reflection planes 103A is inclined by an angle $\theta-\alpha$ in a clockwise direction with respect to the interface 102b of the optical element 102B. Accordingly, the angle that the incident light 250 forms with the first exit light 200 can be calculated by $2(\theta-\alpha)$.

In the present control sample, the angle that the incident light 250 forms with the first exit light 200 is calculated by $-2(\theta-\alpha)$. Accordingly, the angle that the reflection light 251 forms with the first exit light 200 can be calculated by $2(\theta-\alpha)$, and such an angle is smaller than the angle when the surface 103S of the optical modulation element 103 is parallel to the interface 102b of the optical element 102B and $\alpha=0$.

Due to such a configuration, when the surface 103S of the optical modulation element 103 is inclined with reference to the interface 102b of the optical element 102B so as to satisfy the Scheimpflug principle, the chance that the reflection light 251 is incident on the projection optical system 104 increases, and the chance that the reflection light 251 is erroneously projected onto the screen 400 as stray light or unnecessary light increases.

In other words, according to the present control sample of the above embodiment of the present disclosure, the chances of blurriness can be reduced when an image that is formed by the first exit light 200 is projected onto the surface 400S of the screen 400, but the chance that the reflection light 251 is erroneously guided to the screen 400 as stray light or unnecessary light cannot be reduced. Moreover, the incident light 250 needs to be blocked by an amount equivalent to an angle $2\alpha$ in order to reduce the stray light or unnecessary light. Accordingly, in the present control sample of the above embodiment of the present disclosure, it becomes difficult to achieve both high light output and high resolution.

Figure 5:
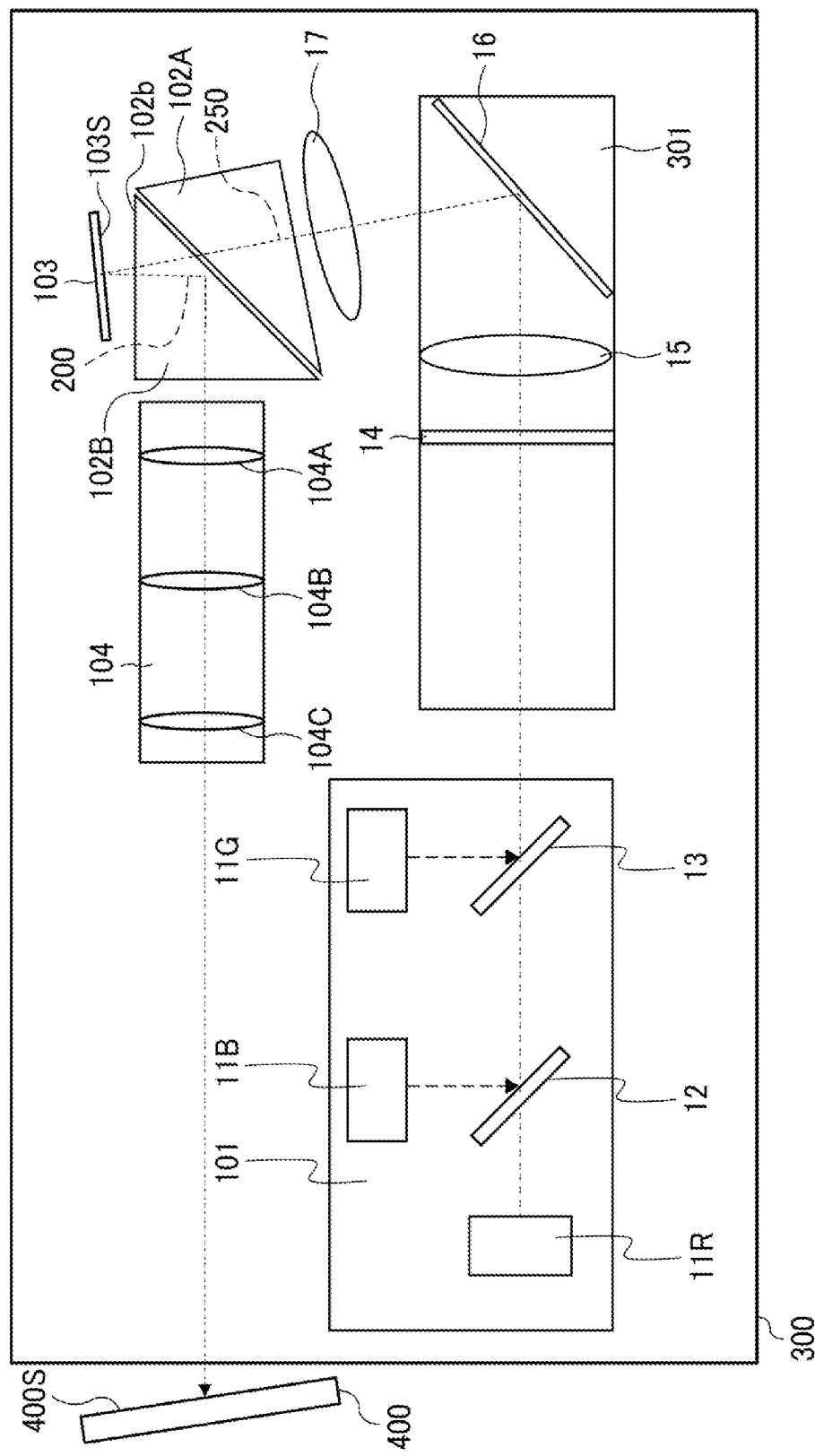
FIG. 5 is a sectional view of the image projection apparatus as illustrated in FIG. 1, according to a modification of the above embodiment of the present disclosure.

FIG. 5 is a sectional view of the image projection apparatus 300 as illustrated in FIG. 1, according to a modification of the above embodiment of the present disclosure.

In a similar manner to the control sample of the above embodiment of the present disclosure as described above with reference to FIG. 3, the surface 400S of the screen 400 as illustrated in FIG. 5 is inclined in the opposite direction with reference to the surface 400S of the screen 400 as illustrated in FIG. 1. In image projection apparatus 300 as illustrated in FIG. 5, the image projection apparatus 300 as illustrated in FIG. 1 is turned upside down, and the surface 103S of the optical modulation element 103 as illustrated in FIG. 5 is also inclined in the opposite direction with reference to the surface 103S of the optical modulation element 103 as illustrated in FIG. 1.

As a result, the surface 400S of the screen 400, the principal plane of the projection optical system 104, the surface 103S of the optical modulation element 103 are arranged so as to satisfy the Scheimpflug principle.

Figure 6:
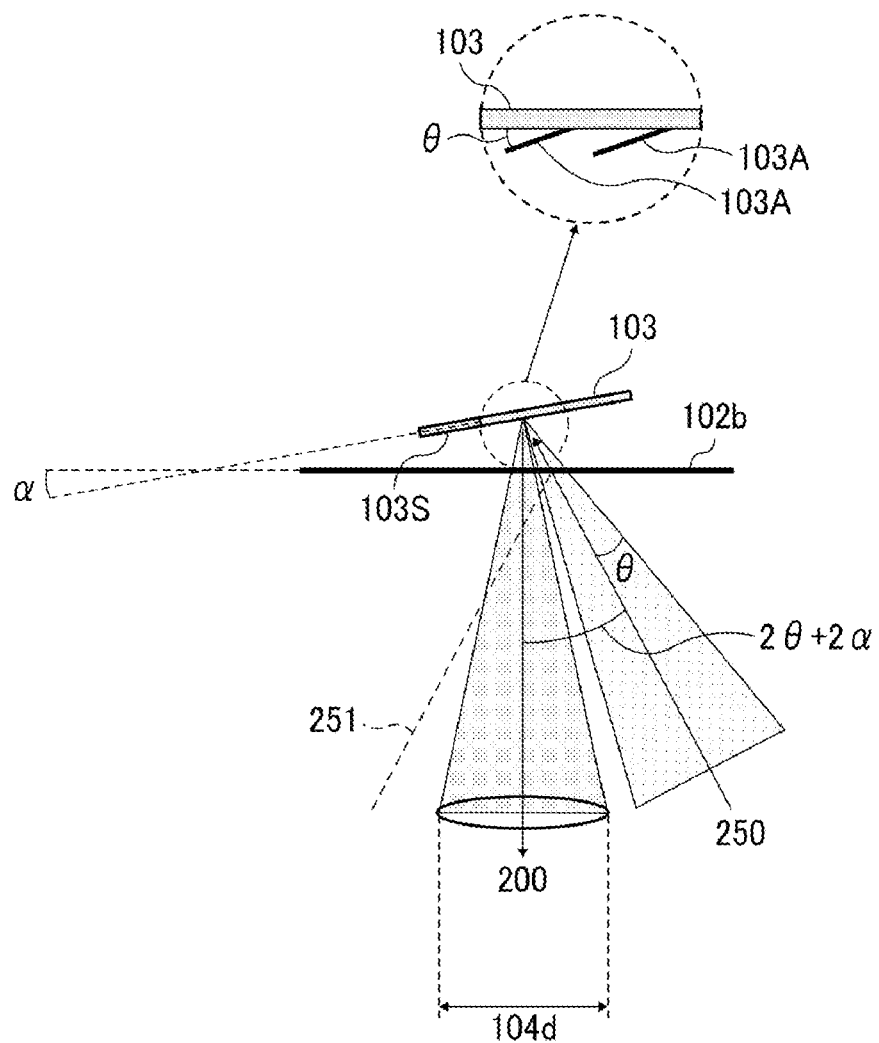
FIG. 6 is a diagram illustrating a detailed configuration or structure of an optical modulation element in the image projection apparatus as illustrated in FIG. 5, according to a modification of the above embodiment of the present disclosure.

FIG. 6 is a diagram illustrating a detailed configuration or structure of the optical modulation element 103 in the image projection apparatus 300 as illustrated in FIG. 5, according to the modification of the above embodiment of the present disclosure.

As the image projection apparatus 300 as illustrated in FIG. 1 is turned upside down in the image projection apparatus 300 as illustrated in FIG. 5, the configuration or structure according to the above embodiment of the present disclosure as described above with reference to FIG. 2 is turned upside down in the modification of the above embodiment of the present disclosure as illustrated in FIG. 6.

Accordingly, in the present modification of the above embodiment of the present disclosure, in a similar manner to the embodiment of the present disclosure as described above with reference to FIG. 2, the direction in which each one of the multiple reflection planes 103A is inclined with reference to the surface 103S of the optical modulation element 103 is equivalent to the direction in which the surface 103S of the optical modulation element 103 is inclined with reference to interface 102b.

Due to such a configuration, when the surface 103S of the optical modulation element 103 is inclined with reference to the interface 102b of the optical element 102B so as to satisfy the Scheimpflug principle, the chance that the reflection light 251 is incident on the projection optical system 104 can be reduced, and the chance that the reflection light 251 is erroneously projected onto the screen 400 as stray light or unnecessary light can be reduced.

In other words, the following two sorts of reductions can be achieved according to the present modification of the above embodiment of the present disclosure. The chances of blurriness can be reduced when an image that is formed by the first exit light 200 is projected onto the surface 400S of the screen 400, and the chance that the reflection light 251 is erroneously guided to the screen 400 as stray light or unnecessary light can be reduced.

As described above, the image projection apparatus 300 according to embodiments of the present disclosure, which serves as an optical system, is provided with the optical modulation element 103 and the optical element 102B. The optical modulation element 103 has the multiple reflection planes 103A by which the incident light 250 is reflected in a different direction, and the optical element 102B has the interface 102b through which the irradiation light that is emitted from the light source is emitted to the optical modulation element 103 as the incident light 250. Moreover, through the interface 102b, the first exit light 200 that is reflected by the optical modulation element 103 in the first direction is guided to the screen 400 that serves as a projection surface. Each one of the multiple reflection planes 103A is inclined by an angle θ with respect to the surface 103S of the optical modulation element 103 to reflect the incident light 250 as the first exit light 200, and the surface 103S of the optical modulation element 103 is inclined by an angle α with respect to the interface 102b of the optical element 102B. Moreover, the direction in which each one of the multiple reflection planes 103A is inclined with reference to the surface 103S of the optical modulation element 103 is equivalent to the direction in which the surface 103S of the optical modulation element 103 is inclined with reference to interface 102b of the optical element 102B.

Due to such a configuration, the angle that the incident light 250 forms with the first exit light 200 can be increased, and the angle that the reflection light 251, which is a part of the irradiation light 250 that is emitted from the light source 101 and then reflected by the interface 102b rather than passing through the interface 102b, forms with the first exit light 200 increases. As a result, the chance that the reflection light 251 is erroneously guided to the screen 400 as stray light or unnecessary light can be reduced.

Preferably, the reflection plane 103A is configured by a digital micromirror device (DMD), and the optical element 102B is configured by a prism.

The image projection apparatus 300 that serves as an optical system is provided with the projection optical system 104 through which the first exit light 200 that has passed through the optical element 102B is projected onto the screen 400. Due to this configuration, the chance that the reflection light 251 is incident on the projection optical system 104 can be reduced, and the chance that the reflection light 251 is erroneously projected onto the screen 400 as stray light or unnecessary light can be reduced.

The surface 400S of the screen 400, the principal planes of the first lens 104A, the second lens 104B, and the third lens 104C of the projection optical system 104, and the surface 103S of the optical modulation element 103 are arranged so as to satisfy the Scheimpflug principle. In such a configuration, the following two sorts of reductions can be achieved. The chances of blurriness can be reduced when an image that is formed by the first exit light 200 is projected onto the surface 400S of the screen 400, and the chance that the reflection light 251 is erroneously guided to the screen 400 as stray light or unnecessary light can be reduced.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims. For example, some of the elements described in the above embodiments may be removed. Further, elements according to varying embodiments or modifications may be combined as appropriate.

This patent application is based on and claims priority to Japanese Patent Application No. 2019-208382, filed on Nov. 19, 2019, in the Japan Patent Office, the entire disclosures of which are hereby incorporated by reference herein.

REFERENCE SIGNS LIST

101 Light source
102B Optical element
102b Interface
103 Optical modulation element
103A Reflection plane
103S Surface
104 Projection optical system
104A First lens
104B Second lens
104C Third les
200 First exit light
250 Incident light (Reflection light)
300 Image projection apparatus
301 Illumination optical system
400 Screen (Projection surface)
400S Surface

The invention claimed is:

1. An optical system comprising:
a light source to emit irradiation light;
an optical modulation element having a plurality of reflection planes by which an incident light is reflected in a different direction; and
an optical element having an interface through which the irradiation light emitted from the light source is emitted to the optical modulation element as the incident light and a first exit light reflected by the optical modulation element in a first direction is guided to a projection surface,
wherein each one of the plurality of reflection planes is inclined with reference to a surface of the optical modulation element to reflect the incident light as the first exit light,
wherein the surface of the optical modulation element is inclined with reference to the interface, and
wherein a direction in which each one of the plurality of reflection planes is inclined with reference to the surface of the optical modulation element is equivalent to a direction in which the surface of the optical modulation element is inclined with reference to the interface.

2. The optical system according to claim 1,
wherein each one of the plurality of reflection planes is a digital micromirror device.

3. The optical system according to claim 1,
wherein the optical element is a prism.

4. The optical system according to claim 1, further comprising:
a projection optical system having at least one lens,
wherein the first exit light that has passed through the optical element is projected onto the projection surface through the at least one lens.

5. The optical system according to claim 4,
wherein the projection surface, the at least one lens of the projection optical system, and the optical element are disposed to satisfy a Scheimpflug principle.

6. An image projection apparatuses comprising: the optical system according to claim 1.

7. The optical system according to claim 1, wherein:
the direction in which each one of the plurality of reflection planes is inclined with reference to the surface of the optical modulation element is a clockwise direction, and the direction in which the surface of the optical modulation element is inclined with reference to the interface is the clockwise direction.

* * * * *